United States Patent
Krishnan et al.

(10) Patent No.: US 12,465,327 B2
(45) Date of Patent: Nov. 11, 2025

(54) GUIDED ACQUISITION OF A 3D REPRESENTATION OF AN ANATOMICAL STRUCTURE

(71) Applicant: KONINKLIJKE PHILIPS N.V., Eindhoven (NL)

(72) Inventors: Karthik Krishnan, Bangalore (IN); Celine Firtion, Surat (IN); Pallavi Vajinepalli, Bangalore (IN); Giridhar Narasapura Rajagopalaiah, Bangalore (IN); Saunak Chatterjee, Bangalore (IN); Robert Gustav Trahms, Edmonds, WA (US); Earl M. Canfield, II, New Braunfels, TX (US); Matthew Rielly, Seattle, WA (US); David Nigel Roundhill, Woodinville, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 3 days.

(21) Appl. No.: 18/038,498

(22) PCT Filed: Nov. 17, 2021

(86) PCT No.: PCT/EP2021/081925
§ 371 (c)(1),
(2) Date: May 24, 2023

(87) PCT Pub. No.: WO2022/112068
PCT Pub. Date: Jun. 2, 2022

(65) Prior Publication Data
US 2024/0099692 A1    Mar. 28, 2024

Related U.S. Application Data

(60) Provisional application No. 63/119,275, filed on Nov. 30, 2020.

(30) Foreign Application Priority Data

Jan. 14, 2021    (EP) .................................... 21151668

(51) Int. Cl.
*A61B 8/00* (2006.01)
*A61B 8/08* (2006.01)
(Continued)

(52) U.S. Cl.
CPC .......... *A61B 8/4245* (2013.01); *A61B 8/0883* (2013.01); *A61B 8/483* (2013.01);
(Continued)

(58) Field of Classification Search
CPC ..... A61B 8/4245; A61B 8/0883; A61B 8/483; G06T 7/75; G06T 17/00;
(Continued)

(56) References Cited

U.S. PATENT DOCUMENTS 7,507,204 B2    3/2009   Shim et al.
8,073,215 B2    12/2011  Lu et al.
(Continued)

FOREIGN PATENT DOCUMENTS

WO    2014147542 A1    9/2014

OTHER PUBLICATIONS

International Search Report and Written Opinion for PCT/EP2021/081925; Mailing date: Jan. 31, 2022, 10 pages.
(Continued)

*Primary Examiner* — Dixomara Vargas

(57) ABSTRACT

There is proposed a mechanism for determining whether or not an imaging probe, such as an ultrasound imaging probe, is at a desired orientation and/or position with respect to an anatomical structure. Image data of the imaging probe is processed to generate a 3D landmark model that contains anatomical landmarks of the anatomical structure. The 3D
(Continued)

landmark model is then processed to determine whether or not the imaging probe is at the desired orientation and/or position.

11 Claims, 5 Drawing Sheets

(51) Int. Cl.
  *G06T 7/73*  (2017.01)
  *G06T 17/00*  (2006.01)
(52) U.S. Cl.
  CPC ............... *G06T 7/75* (2017.01); *G06T 17/00* (2013.01); *G06T 2207/10132* (2013.01); *G06T 2207/20081* (2013.01); *G06T 2207/30048* (2013.01)
(58) Field of Classification Search
  CPC . G06T 2207/10132; G06T 2207/20081; G06T 2207/30048
  See application file for complete search history.

(56) References Cited

U.S. PATENT DOCUMENTS

| | | | |
|---|---|---|---|
| 8,265,363 | B2 | 9/2012 | Orderud et al. |
| 2006/0034513 | A1 | 2/2006 | Cai et al. |
| 2006/0089625 | A1* | 4/2006 | Voegele ............... A61B 34/20 606/1 |
| 2006/0241445 | A1 | 10/2006 | Altmann et al. |
| 2007/0167801 | A1* | 7/2007 | Webler .................. G06T 19/00 600/459 |
| 2008/0009722 | A1 | 1/2008 | Simopoulos et al. |
| 2008/0187193 | A1 | 8/2008 | Hoctor et al. |
| 2012/0093385 | A1* | 4/2012 | Yokosawa ............. A61B 5/055 382/131 |
| 2013/0237811 | A1* | 9/2013 | Mihailescu ........... G01S 15/899 600/407 |
| 2014/0095085 | A1* | 4/2014 | Fetzer .................... G01N 29/11 702/56 |
| 2014/0314290 | A1* | 10/2014 | Dabbah ............. G06F 18/24323 382/131 |
| 2015/0141798 | A1* | 5/2015 | Bar-Tal ................. G01B 7/003 600/409 |
| 2015/0190112 | A1 | 7/2015 | Yeo et al. |
| 2015/0305718 | A1 | 10/2015 | Ogasawara |
| 2016/0038125 | A1 | 2/2016 | Haas et al. |
| 2016/0242745 | A1* | 8/2016 | Yang .................... A61B 8/5223 |
| 2016/0361045 | A1* | 12/2016 | Yoo ...................... A61B 8/0866 |
| 2017/0086785 | A1* | 3/2017 | Bjaerum .............. A61B 8/4444 |
| 2017/0213343 | A1* | 7/2017 | Vaillant .................. A61B 6/12 |
| 2017/0224298 | A1* | 8/2017 | Hannemann .......... A61B 6/469 |
| 2018/0360427 | A1* | 12/2018 | Nakano .................. G06T 7/74 |
| 2019/0105016 | A1* | 4/2019 | Jenaro .................. A61B 8/469 |
| 2019/0107612 | A1* | 4/2019 | Holl .................... G01S 15/8913 |
| 2019/0200964 | A1 | 7/2019 | Sudhakar et al. |
| 2019/0201042 | A1* | 7/2019 | Nott ...................... A61B 17/072 |
| 2019/0311805 | A1* | 10/2019 | Linguraru ............... G06T 7/155 |
| 2020/0196984 | A1* | 6/2020 | Sprung .................... G06T 7/10 |
| 2021/0137488 | A1* | 5/2021 | Yellin .................. A61B 8/0841 |
| 2021/0307862 | A1* | 10/2021 | Hayam .................. A61B 34/25 |
| 2022/0087645 | A1* | 3/2022 | Melapudi ............. A61B 8/4411 |
| 2022/0273281 | A1* | 9/2022 | Mckinnon ........... A61B 17/025 |
| 2022/0319001 | A1* | 10/2022 | Kim .......................... A61N 7/02 |
| 2023/0135286 | A1* | 5/2023 | Pasha .................... A61B 34/20 703/20 |
| 2023/0162355 | A1* | 5/2023 | Tegzes ..................... G06T 7/10 382/128 |
| 2023/0200759 | A1* | 6/2023 | Gatayama ............. A61B 6/469 378/4 |

OTHER PUBLICATIONS

Buethe, J. et al., "Eponymous Cardiovascular Surgeries for Congenital Heart Diseases-Imaging Review and Historical Perspectives", Current Problems in Diagnostic Radiology, 2015, vol. 44, Issue 4, pp. 303-320.
Donofrio, M. et al., "Diagnosis and Treatment of Fetal Cardiac Disease: A Scientific Statement From the American Heart Association", American Heart Association, 2014, vol. 129, Issue 21, pp. 2183-2242.
Holland, B.J. et al., "Prenatal diagnosis of critical congenital heart disease reduces risk of death from cardiovascular compromise prior to planned neonatal cardiac surgery: a meta-analysis", Ultrasound Obstet Gynecol., 2015, vol. 45, pp. 631-638.
Wright, L.K. et al., "Relation of Prenatal Diagnosis With One-Year Survival Rate for Infants With Congenital Heart Disease", Am J Cardiol., 2014, vol. 113, Issue 6, pp. 1041-1044.
Li, Yi-Fei et al., "Efficacy of prenatal diagnosis of major congenital heart disease on perinatal management and perioperative mortality: a meta-analysis", World J Pediatr., 2016, vol. 12, No. 3, pp. 298-307.
Oster, M. et al., "A population-based study of the association of prenatal diagnosis with survival rate for infants with congenital heart defects", Am J Cardiol., 2014, vol. 113, No. 6, pp. 1036-1040.
Friedberg, M. et al., "Prenatal detection of congenital heart disease", J Pediatr., 2009, vol. 155, No. 1, pp. 26-31.
Sekar, P. et al., "Diagnosis of congenital heart disease in an era of universal prenatal ultrasound screening in southwest Ohio", Cardiol Young., 2015, vol. 25, No. 1, Abstract Only.
Carvalho, JS. et al., "ISUOG Practice Guidelines (updated): sonographic screening examination of the fetal heart", Ultrasound Obstet Gynecol., 2013, vol. 41, pp. 348-359.
Arnaout R. et al., "Deep-learning models improve on community-level diagnosis for common congenital heart disease esions", arXiv:1809.06993v1, 2018, 17 pages.
Guardado, J.R., "Medical Liability Claim Frequency Among U.S. Physicians, Policy Research Perspectives", American Medical Associations, 2016, 10 pages.
Anonymous, "AIUM Practice Parameter for the Performance of Fetal Echocardiography", J Ultrasound Med., 2020, vol. 39, Issue 1, E5-E16, 12 pages.
Lee, W. et al., "ISUOG consensus statement: what constitutes a fetal echocardiogram", Ultrasound Obstet Gynecol, 2008, vol. 32, pp. 239-242.
Nelson, TR. et al. "Three-dimensional echocardiographic evaluation of fetal heart anatomy and function: acquisition analysis and display", J Ultrasound Med., 1996, vol. 15, Issue 1, pp. 1-9.
Yaman, C. et al., "Ultrasound Technology Update: 4D fetal echocardiography Spatio-Temporal Image Correlation (STIC) for Fetal Heart Acquisition", J Turkish German Gynecol Assoc, 2004, vol. 5, No. 4, pp. 286-289.
Hadlock, F. et al., "Estimating fetal age: effect of head shape on BPD", American Journal of Roentgenology, 1981, vol. 137, pp. 83-85.
Marzbanrad, F. et al., "Assessment of Fetal Development Using Cardiac Valve Intervals", Front Physiol., 2017, vol. 8, Article 313, 13 pages.
Vinals, F. et al., "Accuracy of prenatal diagnosis of congenital heart defects evaluating the STIC sweep of the acquisition plane", Ultrasound in Obstetrics & Gynecology, 2006, vol. 28, pp. 359-411.
Yeo, L. et al., "Fetal Intelligent Navigation Echocardiography (FINE) Detects 98% of Congenital Heart Disease", J Ultrasound Med., 2018, vol. 37, No. 11, pp. 2577-2593.
Yeo, L. et al., "How to Acquire Cardiac Volumes for Sonographic Examination of the Fetal Heart, Part 1", J Ultrasound Med, 2016, vol. 35, pp. 1021-1042.
Yeo, L. et al., "How to Acquire Cardiac Volumes for Sonographic Examination of the Fetal Heart, Part 2", J Ultrasound Med, 2016, vol. 35, pp. 1043-1066.

\* cited by examiner

GUIDED ACQUISITION OF A 3D REPRESENTATION OF AN ANATOMICAL STRUCTURE

CROSS-REFERENCE TO PRIOR APPLICATIONS

This application is the U.S. National Phase application under 35 U.S.C. § 371 of International Application No. PCT/EP2021/081925, filed on Nov. 17, 2021, which claims the benefit of U.S. Provisional Patent Application No. 63/119,275, filed Nov. 30, 2020, and European Patent Application No. 21151668.7, filed on Jan. 14, 2021. These applications are hereby incorporated by reference herein.

FIELD OF THE INVENTION

The present invention relates to the field of 3D imaging, and in particular, to guidance mechanisms for 3D imaging systems.

BACKGROUND OF THE INVENTION

Congenital heart diseases (CHD), are among the most common types of birth defects, affecting one percent of live births. CHD can be asymptomatic in fetal life but cause significant morbidity and mortality after birth. The earlier CHD is diagnosed, the better the outcomes and therapeutic options at birth. In particular, effective in-utero therapies for specific CHD lesions, such as in utero aortic valvuloplasty for hypoplastic left heart syndrome, are becoming increasing available, and have been shown to significantly improve the natural history and prognosis of the disease.

However, these potential benefits rely on accurate fetal ultrasound diagnosis of CHD. It has been recognized that the fetal diagnosis rate for CHD in the community is in the region of 30-50%, even where fetal ultrasound is universal in the developed nations. However, in theory, a thorough screening of the fetal heart should be able to detect 90% of abnormalities.

The main reason for this diagnosis gap is inadequate/uneven expertise in acquiring the right cardiac planes and interpreting fetal cardiac images. This is believe to be primarily due to the diagnostic challenge presented by a small and fast-beating fetal heart and due to relatively low exposure to each specific type of congenital heart disease among caregivers. Signs of cardiac disease are often subtle, can touch a variety of structures within the heart such as the valves, the septum, the heart muscle, etc., and present under multiple forms/associations (Fallot Tetralogy) necessitating a carefully targeted examination.

There is therefore a need for intuitive, precise, dynamic and interactive display of the fetal heart, to facilitate identification of cardiac anomalies.

US 2019/200964 A1 discloses a system and method for generating a patient-specific organ model based on ultrasound images of an organ and probe position data.

US 2006/241445 A1 discloses a method for modelling an anatomical structure based on measured location and orientation coordinates of an ultrasonic sensor and contours-of-interest in acquired ultrasound images.

SUMMARY OF THE INVENTION

The invention is defined by the claims.

According to examples in accordance with an aspect of the invention, there is provided a computer-implemented method of guiding an imaging process of an anatomical structure of an individual.

The computer-implemented method comprises: obtaining image data of the anatomical structure from an imaging system having an imaging probe; processing the image data to obtain one or more sets of one or more 2D images, each identified set of one or more 2D images representing a different predetermined view of the anatomical structure; identifying one or more predetermined anatomical landmarks in each set of one or more 2D images; processing the one or more predetermined anatomical landmarks to generate a 3D landmark model; and determining whether or not the current orientation and/or position of the imaging probe is within a predetermined range with respect to a desired orientation and/or position of the imaging probe by processing the 3D landmark model.

The present disclosure provides a mechanism for aiding or guiding a clinician in performing an imaging process with an imaging probe. This is achieved by using a 3D landmark model or "pose model" that identifies the relative positions of anatomical landmarks (obtained from the image data) in 3D space. This facilitates identification of whether a desired orientation/position of the imaging probe has been achieved, e.g. by identifying whether the anatomical landmarks are in expected positions and/or whether a field of view of the imaging probe matches a desired field of view (e.g. whether a volume/area imaged by the probe matches a desired volume/area to be imaged), amongst other approaches.

Determining whether or not the orientation and/or position of the imaging probe is within the predetermined range is advantageous for aiding in the guidance of the imaging process, e.g. aiding in the performance of a task of performing an imaging process to capture a desired angle or image of an anatomical structure.

By way of example, when performing imaging using a spatio-temporal image correlation (STIC) technique, it is beneficial to begin imaging from a certain position (or within a particular range of positions) to perform effective and accurate imaging. For instance, during fetal heart monitoring, it is important to image a sufficient range of the fetus in order to obtain a clinically useful image—and selection of an appropriate starting position determines whether a suitable range can be obtained.

Moreover, selection of an appropriate angle of insonification (for an ultrasound imaging system) is beneficial to reduce shadow artefacts in an ultrasound image of an anatomical structure, such as (if imaging a fetal heart) shadow artefacts from the fetal spine and ribs.

Preferably, the step of processing the one or more predetermined anatomical landmarks comprises mapping the one or more predetermined landmarks in each set of one or more 2D images to a 3D co-ordinate system, to thereby generate a 3D landmark model. In this way, the 3D landmark model defines the locations of one or more predetermined landmarks in a 3D coordinate system.

Preferably, the one or more predetermined landmarks comprises a plurality of predetermined landmarks. In some examples, different sets of one or more predetermined landmarks may be identified in each set of one or more 2D images.

The method may further comprise a step of processing the 3D landmark model to determine, for the imaging probe, the desired orientation and/or position with respect to the anatomical structure. The anatomical landmarks represent the location of key features of the anatomical structure. A desired orientation and/or position can be determined based on desired positions for the key features of the anatomical structure. This approach advantageously means that the desired orientation and/or position can be specifically adapted or personalized to the individual undergoing imaging.

The method may further comprise obtaining a user input indicating a desired anatomical feature for imaging, wherein the step of processing the 3D landmark model to determine a desired orientation and/or position comprises processing the 3D landmark model to identify a desired orientation and/or position based on the desired anatomical feature for imaging.

The method may further comprise, in response to determining that the current orientation and/or position of the imaging probe is not within the predetermined range, generating guidance information for moving the imaging probe to a desired orientation and/or position of the image probe with respect to the anatomical structure based on the identified current orientation and/or position of the imaging probe.

In some embodiments, the method comprises providing a user-perceptible output responsive to the guidance information. For instance, the method may comprise providing a visual indicator of a direction in which the imaging probe should be moved to align the imaging probe with the desired orientation and/or position. This approach provides a mechanism by which performance of an improved imaging process can be achieved through use of a guided human-machine interaction process.

The method may comprise, in response to determining that the current orientation and/or position of the imaging probe is within the predetermined range, transmitting a trigger signal to the imaging system to trigger the acquisition of second, different image data of the anatomical structure.

The imaging system can thereby be triggered to acquire image data responsive to the orientation and/or direction of the imaging probe lying within the predetermined range. This means that the imaging system can begin automatically obtaining image data when the imaging probe is in a most appropriate or desired position.

Preferably, the imaging system is an ultrasound imaging system and the second image data is image data obtained using a spatio-temporal image correlation technique. In some examples, the first image data may be image data that is not obtained using a spatio-temporal image correlation (STIC) technique, to save on processing power and energy before a desired orientation/location is reached. The present invention is particularly suited to controlling when used to acquire STIC data, as the accuracy and/or suitability of STIC data is particularly sensitive to the starting position during the imaging process.

The method may further comprise, in response to determining that the current orientation and/or position of the imaging probe is within the predetermined range, providing a user-perceptible output. This user-perceptible output may comprise audio, visual or haptic feedback. This information provides clinically useful information for aiding a user in performing an imaging process, e.g. by providing information that indicates when the imaging probe is in a suitable position. For instance, the user may respond to the user-perceptible output by beginning or initiating an imaging process.

There is also proposed a computer-implemented method of guiding an imaging process of an anatomical structure of an individual, the method comprising: iteratively repeating any previously described method, until the current orientation and/or position of the imaging probe is within the predetermined range.

There is also proposed a computer-implemented method of guiding an imaging process of an anatomical structure of an individual, the computer-implemented method comprising iteratively, until the current orientation and/or position of the imaging probe is within the predetermined range: performing the method of any of claims 1 to 8 (i.e. any previously described method of guiding an imaging process); tracking a subsequent movement of the imaging probe using a position and/or orientation sensor; and iteratively predicting whether or not the orientation and/or position of the imaging probe is within the predetermined range with respect to the desired orientation and/or position of the imaging probe based on the tracked movement, until the predicted orientation and/or position of the imaging probe is within the predetermined range.

In preferred examples, the anatomical structure is a heart. The present disclosure is particularly suited to analysis of hearts, and in particular fetal hearts, due at least to the sophistication of techniques for identifying anatomical landmarks of hearts and the benefit for early recognition of fetal heart anomalies. However, other suitable anatomical structures would be apparent to the skilled person, e.g. a brain, the lungs, a kidney or other organ.

In some examples, each identified set of one or more 2D images represents a different one of the following: a four chamber view, a left ventricular outflow tract view; a right ventricular outflow tract view; a three-vessel view; a three vessel and trachea view; an abdominal situs view; an aortic arch view; and/or a ductal arch view.

In some examples, the step of processing the image data comprises processing the image data using a machine-learning method to identify one or more sets of one or more 2D images.

There is also proposed a computer program product comprising computer program code means which, when executed on a computing device having a processing system, cause the processing system to perform all of the steps of any herein described method.

There is also proposed a processing system for guiding an imaging process of an anatomical structure of an individual.

The processing system is configured to: obtain image data of the anatomical structure from an imaging system having an imaging probe; process the image data to obtain one or more sets of one or more 2D images, each identified set of one or more 2D images representing a different predetermined view of the anatomical structure; identify one or more predetermined anatomical landmarks in each set of one or more 2D images; process the one or more predetermined anatomical landmarks to generate a 3D landmark model; and determine whether or not the current orientation and/or position of the imaging probe is within a predetermined range with respect to a desired orientation and/or position of the imaging probe by processing the 3D landmark model.

The processing system may be adapted to carry out any herein described method, and may be adapted accordingly. Similarly, any herein described method may be adapted to carry out any steps described in connection with the processing system, mutatis mutandis.

The skilled person would be readily capable of adapting any herein described processing system to perform any method herein described. Similarly, the skilled person would be readily capable of adapted any herein described method to carry out the operation of any herein described processing system.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
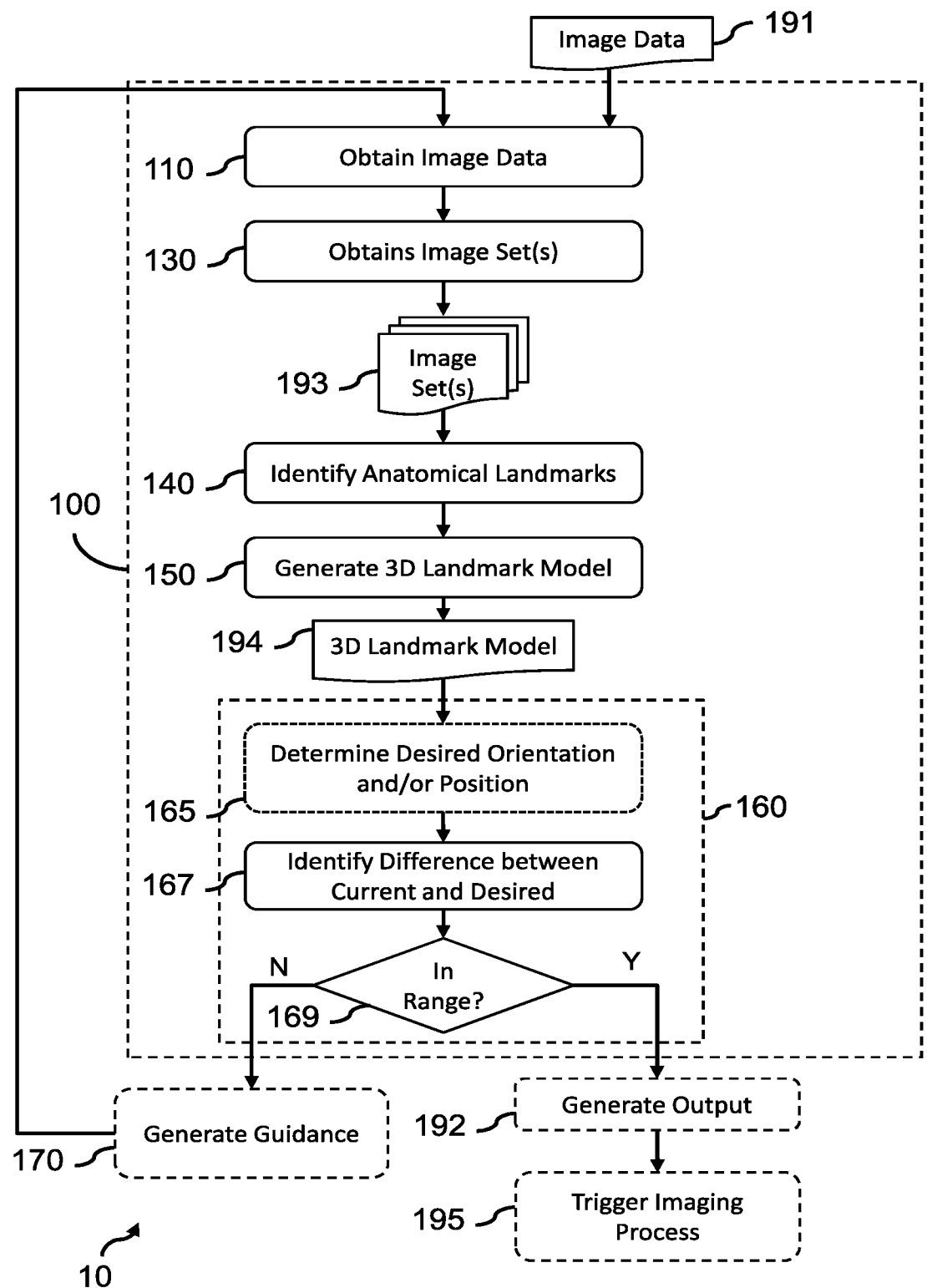
FIG. 1 illustrates a method according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for determining whether or not an imaging probe, such as an ultrasound imaging probe, is at a desired orientation and/or position with respect to an anatomical structure. Image data of the imaging probe is processed to generate a 3D landmark model that contains anatomical landmarks of the anatomical structure. The 3D landmark model is then processed to determine whether or not the imaging probe is at the desired orientation and/or position.

The present disclosure is based on the realization that a 3D landmark model generated from image data obtained by an imaging probe changes as an orientation and/or position of the imaging probe changes. Thus, by processing the position of known anatomical landmarks, a determination as to whether the imaging probe is at (i.e. within a predetermined range of) a desired orientation and/or position can be made.

Embodiments may be employed, for example, in ultrasound imaging process, such as those performed for fetal heart analysis. Embodiments are particularly advantageous for initiating or determining a starting position for performing an STIC acquisition of image data.

FIG. 1 schematically illustrates a workflow 10 including a method 100 performed by an embodiment, for understanding the underlying concept of the present disclosure. Both the workflow 10 and the method 100 represent embodiments of the inventive concept.

Image data 191 of an anatomical structure is obtained in a step 110. The image data is therefore medical image data, such as ultrasound image data, magnetic resonance image data, computed tomography image data, X-ray image data and so on. The image data is any data which, when processed, can produce a 3D image or 3D representation of the anatomical structure.

The image data is obtained from an imaging system that employs an imaging probe, such as an ultrasound probe, to obtain image data. It is conceivable that other forms of directed imaging systems could be employed, such as an X-ray scanner, CT scanner or MRI scanner. The image data may comprise, for instance, low-resolution 3D data, e.g. data obtained when performing a quick sweep of the anatomical structure using the imaging probe.

The image data is obtained whilst the imaging probe is at a same location or position with respect to the anatomical structure, i.e. whilst the imaging probe is stationary. For instance, for ultrasound imaging, where the ultrasound probe is held by a clinician at a same point on the surface of the subject. In this scenario, the image data 191 may be image data obtained by performing a 3D ultrasound image acquisition process using the stationary imaging probe, which obtains a 3D ultrasound image and/or a sequence of 2D ultrasound images (able to represent a 3D imaging volume). Where the image data comprises ultrasound data, this can be performed by the imaging probe transmitting ultrasound pulses in different directions and monitoring a response to the ultrasound pulses of different directions.

The position and/or orientation of the imaging probe thereby defines a current/present imaging volume of the imaging probe, i.e. an area/volume that is currently imaged by the imaging probe. The image data thereby represents image data of a current/present imaging volume imaged by the (stationary) imaging probe, and may comprise ultrasound image data.

The image data may, for instance, comprise image data obtained by performing a coarse 3D scan of the anatomical structure, i.e. a scan that is not performed at the highest possible quality of the imaging system.

The method also performs a step 130 of obtaining one or more (2D) image sets 193 from the image data 191. Each image set 193 comprises one or more 2D images of the anatomical structure from a particular anatomical viewpoint, so that each image set provides a different anatomical viewpoint of the anatomical structure. An image from a particular anatomical viewpoint provides an image of a particular view of the anatomical structure. An image providing a four chamber cardiac view of the heart is an example of an image taken from a particular anatomical viewpoint, although other examples will be readily apparent to the skilled person.

The one or more image sets 193 are obtained in step 130 by processing the image data 191. In one example, a classifier or machine-learning method (e.g. a (convolutional) neural network or other machine-learning method) is used to classify 2D images or 2D slices of the image data to identify images from particular anatomical viewpoints. In another example, tagged images (e.g. images tagged by a clinician during an imaging process) are processed to identify images from particular anatomical viewpoints based on the tags of each image.

The one or more image sets 193 are then processed, in a step 140, to identify anatomical landmarks ("landmark points" or "key points") in each set of one or more 2D images. An anatomical landmark is a point of an individual's anatomy that exhibits homology within a species of the individual, but can differ with respect to different individuals, e.g. a mitrial valve point, a location of a fossa ovalis, a location of the aortic valve and so on.

The anatomical landmarks identified in each set of one or more 2D images may differ depending upon the anatomical viewpoint of the set of 2D images, e.g. as it may be known which anatomical landmarks are supposed to be present for certain anatomical viewpoints. The process 140 may comprise an image segmentation process to identify one or more predetermined anatomical landmarks in each 2D image. Approaches for (automated) identification of anatomical landmarks in 2D medical images are widely known and understood, and may employ machine-learning methods, classifiers and/or edge-detection techniques.

The identified anatomical landmarks are then processed, in a step 150, to generate a 3D landmark model 194. In particular, the identified landmarks may be mapped into a 3D co-ordinate space to generate the 3D landmark model. This is achievable because the anatomical viewpoint of each image in the image set is already known (i.e. the relationship between the images of the image set and a 3D space is already known). In this way, the anatomical landmarks can be directly mapped into or registered with respect to 3D co-ordinates, giving a patient-specific 3D landmark model with key anatomical features/junctions mapped in 3D.

The 3D landmark model may, for example, comprise information defining the co-ordinates of each anatomical landmark in a 3D co-ordinate space.

The 3D landmark model represents the position of the anatomical landmarks with respect to a particular position and/or orientation of the imaging probe. Thus, the position and/or orientation of the 3D landmark model (and the anatomical landmarks contained therein) in 3D space is intrinsically linked to the position and/or orientation of the imaging probe. It will be understood that if the imaging probe were moved, and a new 3D landmark model constructed from new imaging data obtained from the moved imaging probe, then the position and/or orientation of the 3D landmark model will itself change.

For instance, the 3D co-ordinate location of each anatomical landmark may change if the imaging probe is moved.

Thus, the orientation and/or position of the 3D landmark model changes as a current imaging volume of the imaging probe, which is linked to the position and/or orientation of the imaging probe, changes.

The method 100 then performs a step 160 of determining whether or not the current orientation and/or position of the imaging probe is within a predetermined range with respect to a desired orientation and/or position of the imaging probe by processing the 3D landmark model.

As previously explained, the spatial relationship between the position and/or orientation of the imaging probe and the 3D landmark model is known. This is because the 3D landmark model is constructed from imaging data generated by the imaging probe. Conceptually, this spatial relationship is known because the 3D landmark model represents the position of anatomical landmarks in the imaging data 191 obtained in step 110. This relationship facilitates identification of whether or not the position and/or orientation of the imaging probe is within range of a desired position and/or orientation.

In some examples, step 160 may comprise a step 165 of identifying a desired orientation and/or position of the imaging probe by processing the 3D landmark model. This can be performed, for instance, by identifying a desired spatial relationship between the anatomical landmarks of the 3D landmark model and identifying an orientation and/or position of the imaging probe that would achieve this desired spatial relationship.

For instance, a desired orientation and/or position of the imaging probe may be a desired orientation and/or position that would image a particular, predetermined volume of the anatomical structure from a certain viewpoint. This predetermined volume will be associated with predetermined desired positions for the anatomical landmarks, with predetermined spatial relationships between different anatomical landmarks. A box or predetermined shape, representing the desired imaging volume, may be fitted around the anatomical landmarks of the 3D landmark model to identify the desired orientation for the 3D landmark model.

As an example only, if the anatomical structure is a heart, and the desired orientation and/or position of the imaging probe is an orientation and/or position that achieves a four chamber view, then the desired orientation and/or position may be a position in which anatomical landmarks are positioned in a particular configuration to achieve a four chamber view.

In some examples, step 165 may comprise identifying a desired imaging volume by processing the 3D landmark model. This can be performed by processing the 3D landmark model to identify an imaging volume that would position the anatomical landmarks at desired positions and/or with a desired spatial relationship with respect to one another. The desired imaging volume is intrinsically linked to a desired position and/or orientation of the imaging probe (which define the imaging volume imaged by the probe).

This desired imaging volume can be used to determine whether a current imaging volume lies within a predetermined range with respect to the desired imaging volume, and therefore whether a current position and/or orientation of the imaging probe lies within a predetermined range of a desired position and/or orientation of the imaging probe. In other words, an assessment can be made as to whether the current imaging volume aligns with a desired imaging volume.

In some embodiments, the step 165 comprises obtaining a user input indicating a desired anatomical feature or a desired view(point) for imaging, and the desired orientation and/or position comprises processing the 3D landmark model to identify a desired orientation and/or position based on the desired anatomical feature or view(point) for imaging (i.e. so that a desired anatomical feature would be imaged when imaging from the desired orientation and/or position of the imaging probe or so that a desired view is achieved). Step 165 may comprise processing the user input to determine the desired anatomical feature or view(point), and identify a desired position and/or orientation for the imaging probe based on the desired anatomical feature or view(point) (e.g. according to best known medical practices, which may be set out in a look-up table or other suitable mapping system). The desired anatomical feature may, for instance, be a particular anatomical feature for Doppler gating (e.g. a feature to be assessed in a subsequent Doppler imaging process).

Any suitable desired anatomical feature may be indicated, depending on a desired imaging process. For instance, for cranial imaging, the desired anatomical feature may be the circle of Willis or the corpus callosum, e.g. for assessment of agenesis of the corpus callosum. In other examples, e.g. for cardiac imaging, the desired anatomical feature may comprise a desired view of the heart, e.g. a four-chamber view.

In some examples, the desired orientation and/or position for the imaging probe are predetermined and/or preset, e.g.

to define a position and/or position or future imaging according to medical standards or for a particular imaging system. As an example, an imaging system may be specifically designed for fetal heart ultrasound, and the desired orientation and/or position may be predetermined to be the most clinically appropriate position (according to known medical research) for initiating an imaging process such as a STIC acquisition process.

In some examples, step 160 comprises determining a modification or transformation (e.g. translation and/or rotation) of the 3D landmark model required to reposition the 3D landmark model at a desired position/rotation. This effectively defines how the imaging probe should be moved to be positioned and/or oriented so that, if obtaining new imaging data and constructing a new 3D landmark model from the new imaging data, the new 3D landmark model would be orientated and/or positioned at the desired position/rotation.

Thus, the 3D landmark model can be used to effectively determine an error between a current position and/or orientation of the 3D landmark model (and therefore imaging probe) and a desired position and/or orientation of the 3D landmark model. This information can be used to determine whether or not the position and/or orientation of the imaging probe is within range of a desired position and/or orientation. This information could also be used to provide guidance on how to modify the position and/or orientation of the imaging probe to arrive at a desired position and/or orientation.

Step 160 may therefore comprise a step 167 of determining a difference between the desired orientation and the current orientation. The determined difference is a numerical value or measure that represents a required difference between the current orientation and/or position and a desired orientation and/or position. This may be performed, for instance, by determining a required change in orientation (e.g. in degrees or radians) and/or a change in position (e.g. a distance measurement).

For instance, step 167 may comprise determining a transformation that needs to be applied to the landmark model to align the landmark model with a desired position and/or orientation for the landmark model, i.e. so that anatomical landmarks are positioned at desired locations and/or positions with respect to one another. This transformation defines a required change in position and/or orientation of the imaging probe, as the position and/or orientation of the landmark model and the position and/or orientation of the imaging probe are linked (e.g. by a predetermined and/or known relationship).

Some combination of these parameters may be used to define the difference for the purposes of step 167.

Step 160 may also comprise a step 169 of determining whether the current position and/or orientation of the imaging probe is within a predetermined range with respect to a desired position and/or orientation of the imaging probe. This can be achieved, for instance, by determining whether or not the determined difference (e.g. calculated in step 167) exceeds or breaches some predetermined threshold.

In another example, step 160 may comprise determining whether or not the 3D landmark model is within a predetermined range of a desired pattern for the 3D landmark model, e.g. to determine whether or not the 3D landmark model demonstrates that the imaging probe is at a desired position and/or orientation with respect to the anatomical structure.

In one example, which could be employed where the 3D landmark model comprises information defining the co-ordinates of a plurality of anatomical landmarks in a 3D co-ordinate space, step 160 may comprise determining, for each anatomical landmark, a distance between the position of the anatomical landmark and a reference position (representing a position of the anatomical landmark in a 3D co-ordinate space for a desired position and/or orientation of the imaging probe). An average distance may be used as a measure of an error between the current position and/or orientation of the imaging probe and a desired position and/or orientation of the imaging probe. If this measure of error exceeds some predetermined threshold, this indicates that the imaging probe does not lie within a predetermined range of a desired position and/or orientation for the imaging probe.

Figure 2:
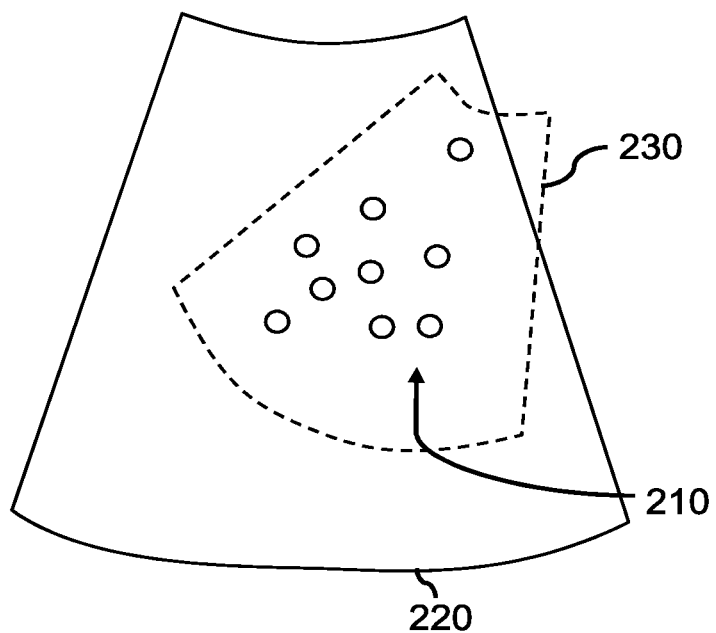
FIGS. 2 and 3 both illustrate a current imaging volume and a desired imaging volume of an anatomical structure.
Figure 3:
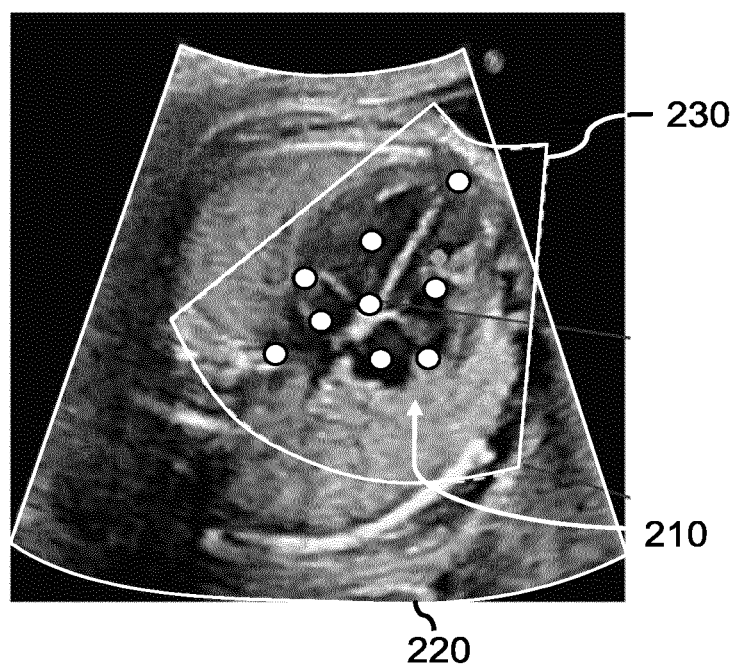

FIGS. 2 and 3 conceptually illustrate an example process for determining whether or not a current orientation and/or position of the imaging probe is within a predetermined range with respect to a desired orientation and/or position of the imaging probe.

In particular, FIG. 2 illustrates a 3D landmark model 210 (shown as a 2D projection of the 3D landmark model). The 3D landmark model is constructed from imaging data as previously described. The 3D landmark model thereby defines a current imaging volume 220, i.e. which reflects a current position and/or orientation of the imaging probe. In particular, one surface of the 3D landmark model (e.g. an uppermost surface of a frustum representing the imaging volume, for the sake of ultrasound imaging) can represent a position and/or orientation of the imaging probe.

It is possible to identify a desired position and/or orientation of the imaging probe from the 3D landmark model, e.g. by identifying an imaging volume 230 that would position the anatomical landmarks of the 3D landmark model at desired positions and/or with a desired spatial relationship.

More specifically, FIG. 2 illustrates how a desired imaging volume 230 can be determined from the 3D landmark model, e.g. a desired imaging volume can be selected so that the positions of the anatomical landmarks of the 3D landmark model 210 are at desired positions (e.g. for imaging a particular anatomical feature and/or achieving a particular anatomical view).

The difference between the current imaging volume 220 and the desired imaging volume 230 can be determined, i.e. to determine data representing a difference between a current position and/or orientation of the imaging probe and a desired position and/or orientation of the imaging probe. For instance, the difference may be a transformation (e.g. defining a change in orientation and/or position) that, if applied to the 3D landmark model, would result in the 3D landmark model being aligned in a desired orientation and/or position.

FIG. 3 illustrates a cross-section of imaging data suitable for use in generating a 3D landmark model, represented in FIG. 2. The relative positions of the anatomical landmarks of the 3D landmark model 210 and the relative position of the current imaging volume 220 and the desired imaging volume 230 are also illustrated.

Turning back to FIG. 1, the workflow 10 may further comprise a step 170 of generating guidance for a user, e.g. guidance to be presented to a user by controlling a user interface. The guidance may provide information on how to change the orientation and/or position of the image probe to achieve a desired orientation and/or position of the imaging probe. For instance, the guidance may provide information on how to change the orientation and/or position of the imaging probe to result in an imaging volume that aligns with the desired imaging volume. This guidance may, for instance, comprise elevation and azimuth correction angles for an imaging probe, e.g. for an ultrasound imaging probe.

This guidance may be represented visually (e.g. through the use of textual output and/or graphical output such as arrows or the like) and/or audibly (e.g. though the use of audible instructions for the user).

In at least one embodiment, step 170 comprises processing the 3D landmark model to generate the guidance (information) for the user.

In one example, this process may comprise determining a transformation to be applied to the 3D landmark model that would result in the 3D landmark model matching or aligning with a reference 3D landmark model. A relationship between this transformation and a required movement of the imaging probe is known or predetermined (as the 3D landmark model is generated from image data obtained by the imaging probe), so that guidance (information) for how the imaging probe should be moved can be determined.

In a second example, step 170 comprises determining a difference between a current imaging volume and a desired imaging volume (which is defined by processing the 3D landmark model to identify a shape that places the anatomical landmarks at desired reference positions). This difference may be processed to determine a required change to the current imaging volume, e.g. a translation and/or orientation, to align the current imaging volume with the desired image volume. This information may be processed to generate guidance (information) for guiding a user on how to change the imaging volume (and therefore the orientation and/or position of the imaging probe) to achieve the desired imaging volume.

In some examples, as illustrated, the guidance is generated if it is determined (in step 169) that the current orientation and/or position of the imaging probe is not within the predetermined range.

The workflow 10 may further comprise, in response to determining that the current orientation and/or position of the imaging probe is within the predetermined range, a step 192 of generating an output indicating that the imaging probe is aligned with a desired orientation and/or position. This output may be an electrical signal or change in an electrical signal.

In some examples, the output generated in step 192 may be used to control a user interface for communicating this alignment with a user (e.g. triggering a green light, generating a text output and/or generating a beep/vibration indicating that the current orientation and/or position of the imaging probe is aligned with a desired orientation and/or position). Thus, the output of step 192 may be a user-perceptible output (e.g. a visual, audio or haptic output).

This user-perceptible output provides the user, e.g. the clinician, with useful clinical information for understanding when the imaging probe is at a predetermined or desired position. The user may then be able to manually trigger a further imaging process, e.g. which has been initiated at a desired position and/or orientation for the imaging probe.

In some examples, the output of step 160 may be used to automatically trigger the acquisition of second, different image data of the anatomical structure (using the same imaging probe/system).

Thus, in some examples, the workflow 10 may comprise a step 195 of, in response to determining that the current orientation and/or position of the imaging probe is within the predetermined range, transmitting a trigger signal to the imaging system to trigger the acquisition of second, different image data of the anatomical structure.

In particularly preferred embodiments, the resolution and/or quality of the image data is less than the resolution of the second image data. Thus, an imaging probe may be guided to a desired/preferred position and/or orientation by processing low quality image data, before subsequently being used to obtain high quality imaging data.

The use of step 195 is particularly advantageous when the imaging system is an ultrasound imaging system and the second image data is image data obtained using a spatio-temporal image correlation (STIC) technique. This is because STIC images require significant processing power, and benefit significantly from being initiated from a particular position and/or orientation.

In some examples, particularly advantageous when the anatomical structure is a fetal heart, the desired position and/or orientation of the imaging probe may be a position and/or orientation in which the imaging probe is able to obtain a 4-chamber view of the fetal heart and in which the probe is positioned to lie above the anterior fetal chest. This position has been shown to provide particularly high-quality acquisition of STIC images. The skilled person will appreciate that such a position is associated with a particular arrangement or pattern for the 3D landmark model, i.e. a 3D landmark model positioned and/or orientated at a specific position.

In some examples, step 195 may comprise setting one or more imaging parameters (e.g. for the automatically triggered imaging) based on the 3D landmark model. This process, of setting one or more image parameters, may also be performed even if the imaging is not triggered automatically.

For instance, a focal point of an ultrasound imaging process performed by an ultrasound imaging system may be set based on the position of a predetermined anatomical landmark in the 3D landmark model. As an example, for fetal heart ultrasound imaging, a focal point of the ultrasound imaging process may be determined based on a position and/or location of an anatomical landmark representing the crux (center of the heart).

As another example, step 195 may comprise setting one or more Doppler window parameters (e.g. setting the position for an area of an ultrasound image to be produced using a Doppler-based imaging process) based on the 3D landmark model. For instance, the 3D landmark model may be processed to identify an appropriate/desired position for placing a gate, window, area or volume of an ultrasound image from which Doppler shifts are to be recorded. This is achievable because the 3D landmark model facilitates identification of desired positions with respect to the ultrasound image, which allows the placement of a gate for Doppler imaging at a desired position. The desired position may be indicated by a user input or based on standard operating practices (e.g. as set out in historical data, literature and so on).

In some examples, the method 100 may be iteratively repeated as the imaging probe is moved, e.g. to iteratively determine whether the imaging probe is within range of a desired position and/or orientation for the imaging probe.

Figure 4:
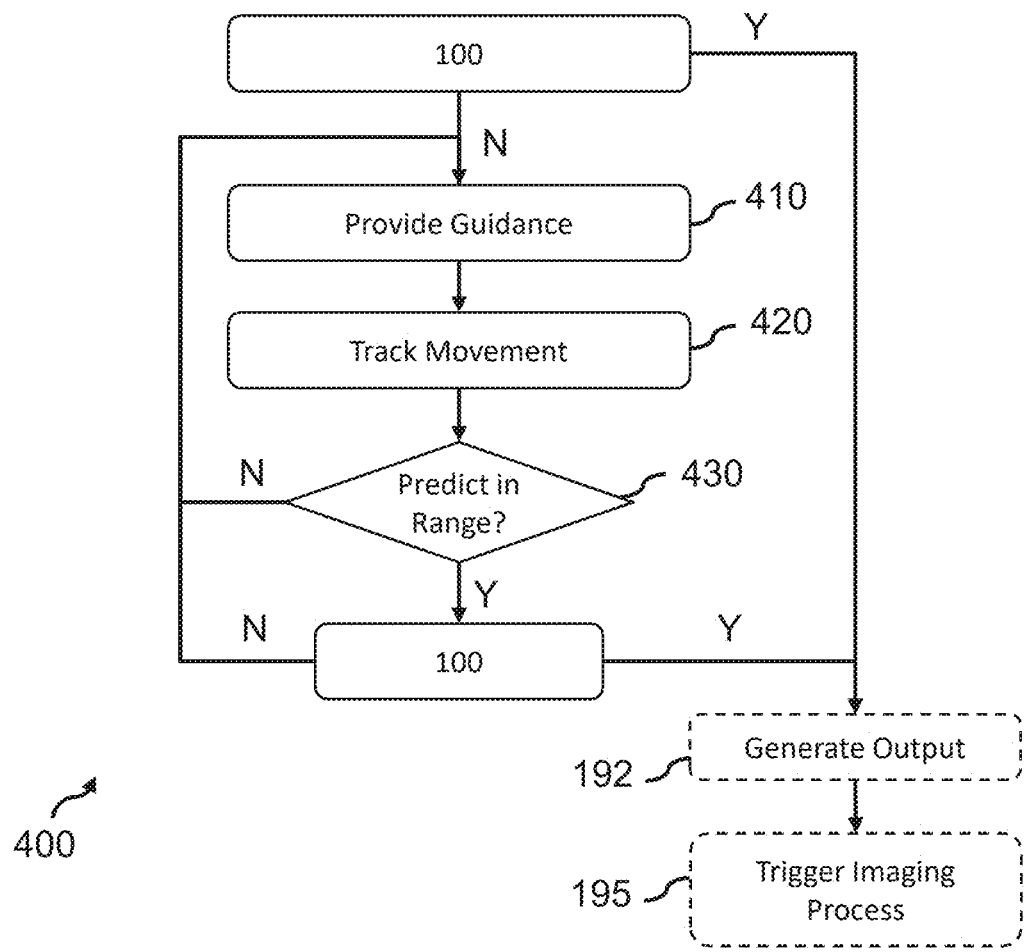
FIG. 4 illustrates a method according to an embodiment.

FIG. 4 is a flowchart illustrating a method 400 according to an embodiment of the invention. The method 400 is designed for guiding an imaging process of an anatomical structure of an individual, the computer-implemented method comprising iteratively, until the current orientation and/or position of the imaging probe is within the predetermined range.

The method 400 comprises performing the method 100, or workflow 10, previously described.

The method 400 also comprises a step 410 of generating guidance for a user, e.g. by controlling a user interface, in response to method 100 predicting that the imaging probe is not within a predetermined range of a desired orientation and/or position for the imaging probe. The guidance may provide information on how to change the orientation and/or position of the image probe to achieve a desired orientation and/or position of the imaging probe.

Step 410 may be performed in a similar/identical manner to step 170 previously described, and can be omitted (e.g. if step 170 is performed as part of method 100).

The method 400 also comprises step 420 of tracking a (subsequent) movement of the imaging probe. Step 420 is performed using a position and/or orientation sensor, such as an accelerometer (e.g. mounted in the imaging probe itself), an optical tracking system, a camera-based tracking system (e.g. monitoring the imaging probe and using image recognition technology), a magnetic-based tracking system and so on. Mechanisms for using such sensors for tracking a position and/or orientation of an object, such as an imaging probe, are well establishing and known in the prior art.

The method 400 comprises a process 430 of iteratively predicting whether or not the orientation and/or position of the imaging probe is within the predetermined range with respect to the desired orientation and/or position of the imaging probe based on the tracked movement, e.g. until the predicted orientation and/or position of the imaging probe is within the predetermined range.

In other words, changes in position and/or orientation of the imaging probe may be tracked, and used to establish whether the imaging probe is being aligned with the desired orientation and/or position for the imaging probe. Information on the necessary changes in orientation and/or position for the imaging probe is derived from the 3D landmark model as previously described.

This approach reduces the number of times that image data needs to be obtained, e.g. avoids needing to iteratively/repeatedly perform method 100, to predict whether the imaging probe is within a predetermined range of a desired orientation and/or position for the imaging probe.

Effectively, method 400 proposes using a 3D landmark model to determine any changes to a position and/or orientation of an ultrasound probe to achieve a desired position and/or orientation, and subsequently tracking movement of the ultrasound probe using a position and/or orientation sensor to determine/predict when a desired orientation and/or position of the ultrasound probe has been achieved. This provides an approach for highly accurate guiding of an imaging process without requiring repeated acquisition of imaging data (e.g. as would be required if method 100 were simply repeated).

In some examples, in response to process 430 predicting that the orientation and/or position of the imaging probe is within the predetermined range, method 100 is repeated (i.e. a second instance of method 100 is performed). This facilitates the performance of a more accurate/precise prediction of whether or not the imaging probe is within the predetermined range of the desired orientation and/or position for the imaging probe.

In response to this second instance of method 100 predicting that the imaging probe is not within the predetermined range of the desired orientation and/or position for the imaging probe, the method may revert to step 410/420. Otherwise, step 192 and/or 195 (previously described with reference to FIG. 1) may be performed.

Figure 5:
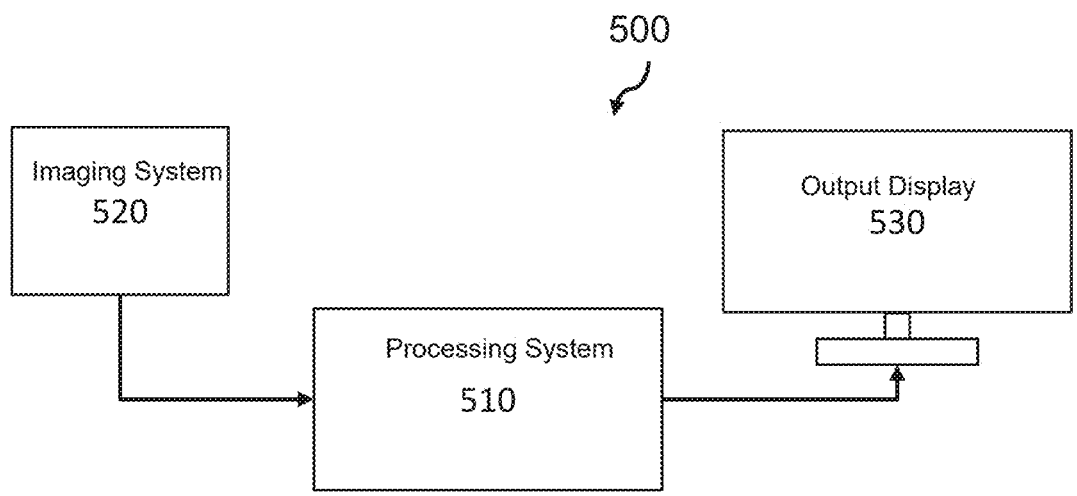
FIG. 5 illustrates a system comprising a processing system according to an embodiment.

FIG. 5 illustrates a system 500 comprising a processing system 510 according to an embodiment of the invention.

The system 500 also comprises an imaging system 520 and an output display 530. The processing system 510 is designed for guiding an imaging process of an anatomical structure of an individual.

The processing system 510 is configured to obtain image data of the anatomical structure from the imaging system 520 having an imaging probe; process the image data to obtain one or more sets of one or more 2D images, each identified set of one or more 2D images representing a different predetermined view of the anatomical structure; identify one or more predetermined anatomical landmarks in each set of one or more 2D images; process the one or more predetermined anatomical landmarks to generate a 3D landmark model; and determine whether or not the current orientation and/or position of the imaging probe is within a predetermined range with respect to a desired orientation and/or position of the imaging probe by processing the 3D landmark model.

Thus, the processing system 510 is configured to perform the method 100 described with reference to FIG. 1. The processing system 510 may be appropriately configured to carry out any previously described method, mutatis mutandis.

As one example, the processing system 510 may be configured to generate guidance for a user, e.g. by controlling a user interface such as the output display 530.

The guidance may provide information on how to change the orientation and/or position of the image probe to achieve a desired orientation and/or position of the imaging probe. For instance, the guidance may provide information on how to change the orientation and/or position of the imaging probe to result in an imaging volume that aligns with the desired imaging volume. This guidance may, for instance, comprise elevation and azimuth correction angles for an imaging probe, e.g. for an ultrasound imaging probe.

This guidance may be represented visually via the output display 530 (e.g. through the use of textual output and/or graphical output such as arrows or the like).

In this way, the processing system 510 may be configured to control the output display 530 responsive to a determination of whether or not the current orientation and/or position of the imaging probe is within a predetermined range with respect to a desired orientation and/or position of the imaging probe.

The output display 530 may, for instance, comprise a monitor or screen configured to provide a visual output of the guidance, as provided by the processing system 510.

Figure 6:
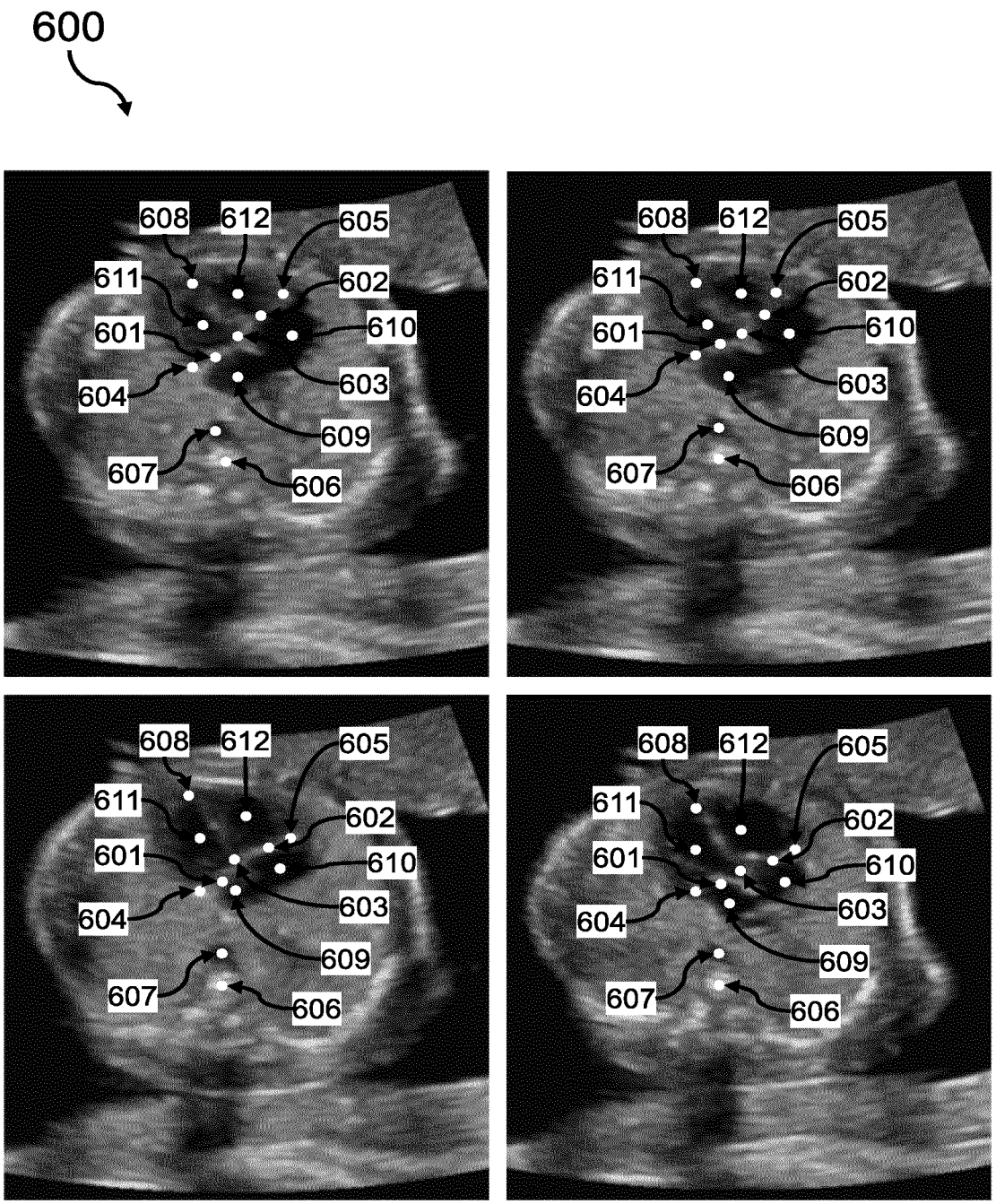
FIG. 6 illustrates a set of 2D images of a fetal heart obtained from ultrasound image data over a cardiac cycle.

FIG. 6 shows a set of 2D images 600 of a fetal heart obtained from ultrasound image data over a cardiac cycle. FIG. 6 thereby illustrates an exemplary outcome of step 130 previously described with reference to FIG. 1.

The set represents a four chamber view of the fetal heart at different phases of the cardiac cycle, with 12 anatomical landmarks tracked across the phases. Points 601 and 602 are the mid-points of the mitral and tricuspid valves, point 603 is the crux of the heart, points 604 and 605 are the end points of the mitral and tricuspid valves, point 606 is the spine, point 607 is the aorta, point 608 is the apex of the heart, points 609 and 610 are the left and right atria, and points 611 and 612 are the left and right ventricles.

Further sets of 2D images may be obtained from the same ultrasound imaging data, each representing a different predetermined view. For example, further sets of 2D images corresponding to a left ventricular outflow tract view, a right ventricular outflow tract view, a three-vessel view, a three vessel and trachea view, an abdominal situs view, an aortic arch view and/or a ductal arch view may be obtained from the ultrasound image data. The anatomical landmarks visible in each set of 2D images may be tracked over all phases of the cardiac cycle. The tracked points across all views may be mapped to 3D coordinates to generate a 3D landmark model.

Although examples have been described in the context of suitably positioning the imaging probe for initiating a STIC acquisition process, the skilled person will appreciate how the proposed system can be used for any suitable imaging process that would benefit from placement of the imaging probe at a specific or particular position. For instance, a Doppler (ultrasound) imaging process, would benefit from placement of the imaging probe at a suitable location for targeting Doppler imaging of a desired anatomical feature (such as the IntraVentricular Septum for imaging a heart or the circle of Willis for transcranial Doppler imaging).

Figure 7:
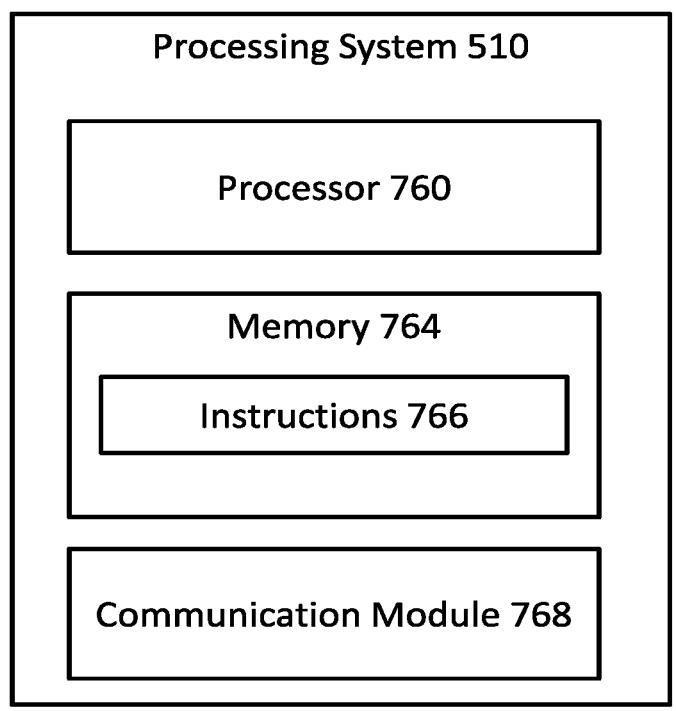
FIG. 7 illustrates a processing system.

FIG. 7 is a schematic diagram of a processing system 510, according to embodiments of the present disclosure. As shown, the processing system 510 may include a (data) processor 760, a memory 764, and a communication module 768. These elements may be in direct or indirect communication with each other, for example via one or more buses.

The processor 760 may include a central processing unit (CPU), a digital signal processor (DSP), an ASIC, a controller, an FPGA, another hardware device, a firmware device, or any combination thereof configured to perform the operations described herein. The processor 760 may also be implemented as a combination of computing devices, e.g., a combination of a DSP and a microprocessor, a plurality of microprocessors, one or more microprocessors in conjunction with a DSP core, or any other such configuration. In some embodiments, the processor is a distributed processing system, e.g. formed of a set of distributed processors.

The memory 764 may include a cache memory (e.g., a cache memory of the processor 760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 764 includes a non-transitory computer-readable medium. The non-transitory computer-readable medium may store instructions. For example, the memory 764, or non-transitory computer-readable medium may have program code recorded thereon, the program code including instructions for causing the processing system 510, or one or more components of the processing system 510, particularly the processor 760, to perform the operations described herein. For example, the processing system 510 can execute operations of the method 700. Instructions 766 may also be referred to as code or program code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements. The memory 764, with the code recorded thereon, may be referred to as a computer program product.

The communication module 768 can include any electronic circuitry and/or logic circuitry to facilitate direct or indirect communication of data between the processing system 510, the penetration device and/or the user interface (or other further device). In that regard, the communication module 768 can be an input/output (I/O) device. In some instances, the communication module 768 facilitates direct or indirect communication between various elements of the processing circuit 510 and/or the system (FIG. 5).

It will be understood that disclosed methods are preferably computer-implemented methods. As such, there is also proposed the concept of a computer program comprising computer program code for implementing any described method when said program is run on a processing system, such as a computer or a set of distributed processors.

Different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

The present disclosure proposes a computer program (product) comprising instructions which, when the program is executed by a computer or processing system, cause the computer or processing system to carry out (the steps of) any herein described method. The computer program (product) may be stored on a non-transitory computer readable medium.

Similarly, there is also proposed a computer-readable (storage) medium comprising instructions which, when executed by a computer or processing system, cause the computer or processing system to carry out (the steps of) any herein described method. There is also proposed computer-readable data carrier having stored thereon the computer program (product) previously described. There is also proposed a data carrier signal carrying the computer program (product) previously described.

The skilled person would be readily capable of developing a processing system for carrying out any herein described method. Thus, each step of a flow chart may represent a different action performed by a processing system, and may be performed by a respective module of the processing system.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of guiding an imaging process of an anatomical structure of an individual, the computer-implemented method comprising iteratively, until the current orientation and/or position of the imaging probe is within the predetermined range:
  obtaining image data of the anatomical structure from an imaging system having an imaging probe;
  processing the image data to obtain one or more sets of one or more 2D images, each identified set of one or more 2D images representing a different predetermined view of the anatomical structure;
  identifying one or more predetermined anatomical landmarks in each set of one or more 2D images;
  processing the one or more predetermined anatomical landmarks to generate a 3D landmark model;
  determining whether or not the current orientation and/or position of the imaging probe is within a predetermined range with respect to a desired orientation and/or position of the imaging probe by processing the 3D landmark model;
  tracking a subsequent movement of the imaging probe using a position and/or orientation sensor;
  iteratively predicting whether or not the orientation and/or position of the imaging probe is within the predetermined range with respect to the desired orientation and/or position of the imaging probe based on the tracked movement, until the predicted orientation and/or position of the imaging probe is within the predetermined range; and
  in response to determining that the current orientation and/or position of the imaging probe is within the predetermined range, automatically generating an electrical output signal to control a user-perceptible output indicating that the current orientation and/or position of the imaging probe is aligned with the desired orientation and/or position.

2. The computer-implemented method of claim 1, wherein the step of processing the one or more predetermined anatomical landmarks comprises mapping the one or more predetermined landmarks in each set of one or more 2D images to a 3D co-ordinate system, to thereby generate a 3D landmark model.

3. The computer-implemented method of claim 1, further comprising a step of processing the 3D landmark model to determine, for the imaging probe, the desired orientation and/or position with respect to the anatomical structure.

4. The computer-implemented method of claim 3, further comprising obtaining a user input indicating a desired anatomical feature for imaging, wherein the step of processing the 3D landmark model to determine a desired orientation and/or position comprises processing the 3D landmark model to identify a desired orientation and/or position based on the desired anatomical feature for imaging.

5. The computer-implemented method of claim 1, further comprising, in response to determining that the current orientation and/or position of the imaging probe is not within the predetermined range, generating guidance information for moving the imaging probe to a desired orientation and/or position of the image probe with respect to the anatomical structure based on the identified current orientation and/or position of the imaging probe.

6. The computer-implemented method of claim 1, further comprising, in response to determining that the current orientation and/or position of the imaging probe is within the predetermined range, transmitting a trigger signal to the imaging system to trigger the acquisition of second, different image data of the anatomical structure.

7. The computer-implemented method of claim 6, wherein the imaging system is an ultrasound imaging system and the second image data is image data obtained using a spatio-temporal image correlation technique.

8. The computer-implemented method of claim 1, wherein the anatomical structure is a heart.

9. The computer-implemented method of claim 8, wherein each identified set of one or more 2D images represents a different one of the following: a four chamber view, a left ventricular outflow tract view; a right ventricular outflow tract view; a three-vessel view; a three vessel and trachea view; an abdominal situs view; an aortic arch view; and/or a ductal arch view.

10. The computer-implemented method of claim 1, wherein the step of processing the image data comprises processing the image data using a machine-learning method to identify one or more sets of one or more 2D images.

11. A processing system for guiding an imaging process of an anatomical structure of an individual, the processing system being configured to:
  obtain image data of the anatomical structure from an imaging system having an imaging probe;
  process the image data to obtain one or more sets of one or more 2D images, each identified set of one or more 2D images representing a different predetermined view of the anatomical structure;
  identify one or more predetermined anatomical landmarks in each set of one or more 2D images;
  process the one or more predetermined anatomical landmarks to generate a 3D landmark model;
  track a subsequent movement of the imaging probe using a position and/or orientation sensor;
  iteratively predict whether or not the orientation and/or position of the imaging probe is within the predetermined range with respect to the desired orientation and/or position of the imaging probe based on the tracked movement, until the predicted orientation and/or position of the imaging probe is within the predetermined range; and
  determine whether or not the current orientation and/or position of the imaging probe is within a predetermined range with respect to a desired orientation and/or position of the imaging probe by processing the 3D landmark model and
  in response to determining that the current orientation and/or position of the imaging probe is within the predetermined range, automatically generating an electrical output signal to control a user-perceptible output indicating that the current orientation and/or position of the imaging probe is aligned with the desired orientation and/or position.

* * * * *